US012105041B2

(12) United States Patent
Park et al.

(10) Patent No.: US 12,105,041 B2
(45) Date of Patent: Oct. 1, 2024

(54) RINGER SOLUTION DETECTION DEVICE AND DETECTION DEVICE

(71) Applicant: UIF (University Industry Foundation), Yonsei University, Seoul (KR)

(72) Inventors: Cheol Min Park, Seoul (KR); Jeongok Park, Seoul (KR); Seung Won Lee, Seoul (KR); Ji Hye Jang, Chungcheongbuk-do (KR); Hye Jin Kim, Seoul (KR); Kyoung Jin Lee, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 217 days.

(21) Appl. No.: 17/974,832

(22) Filed: Oct. 27, 2022

(65) Prior Publication Data

US 2023/0128762 A1    Apr. 27, 2023

(30) Foreign Application Priority Data

Oct. 27, 2021  (KR) .......... 10-2021-0144731
Oct. 27, 2021  (KR) .......... 10-2021-0144733

(51) Int. Cl.
| G01N 27/06 | (2006.01) |
| G01N 27/07 | (2006.01) |
| G01N 27/14 | (2006.01) |
| G01N 27/22 | (2006.01) |

(52) U.S. Cl.
CPC .......... *G01N 27/07* (2013.01); *G01N 27/14* (2013.01); *G01N 27/226* (2013.01); *G01N 2201/1211* (2013.01); *G01N 2201/1218* (2013.01)

(58) Field of Classification Search
CPC ....... G01N 27/07; G01N 27/226; G01N 27/14
See application file for complete search history.

(56) References Cited

U.S. PATENT DOCUMENTS

| 3,465,202 A * | 9/1969 | Tadao | H05B 44/00 |
| | | | 250/214 LA |
| 3,571,647 A * | 3/1971 | Robinson | H05B 33/26 |
| | | | 313/511 |
| 2014/0192105 A1* | 7/2014 | Nakamura | B41J 2/04541 |
| | | | 310/317 |
| 2021/0159439 A1* | 5/2021 | Park | H05B 33/20 |

FOREIGN PATENT DOCUMENTS

| KR | 10-2250717 B1 | 5/2021 |
| KR | 10-2277532 B1 | 7/2021 |

OTHER PUBLICATIONS

Jong Sung Kim et al., "Sensing and memorising liquids with polarity-interactive ferroelectric sound", Nature Communications, 2019, pp. 1-12.

* cited by examiner

*Primary Examiner* — Alesa Allgood
(74) *Attorney, Agent, or Firm* — Paratus Law Group, PLLC

(57) ABSTRACT

A detection device includes a substrate, first electrodes formed on a first surface of the substrate, a responsive layer, and second electrodes formed on a first surface of the responsive layer, each of the second electrodes are capacitively coupled to one of the first electrodes and each second electrode is connected to a power supply to provide driving power.

28 Claims, 14 Drawing Sheets

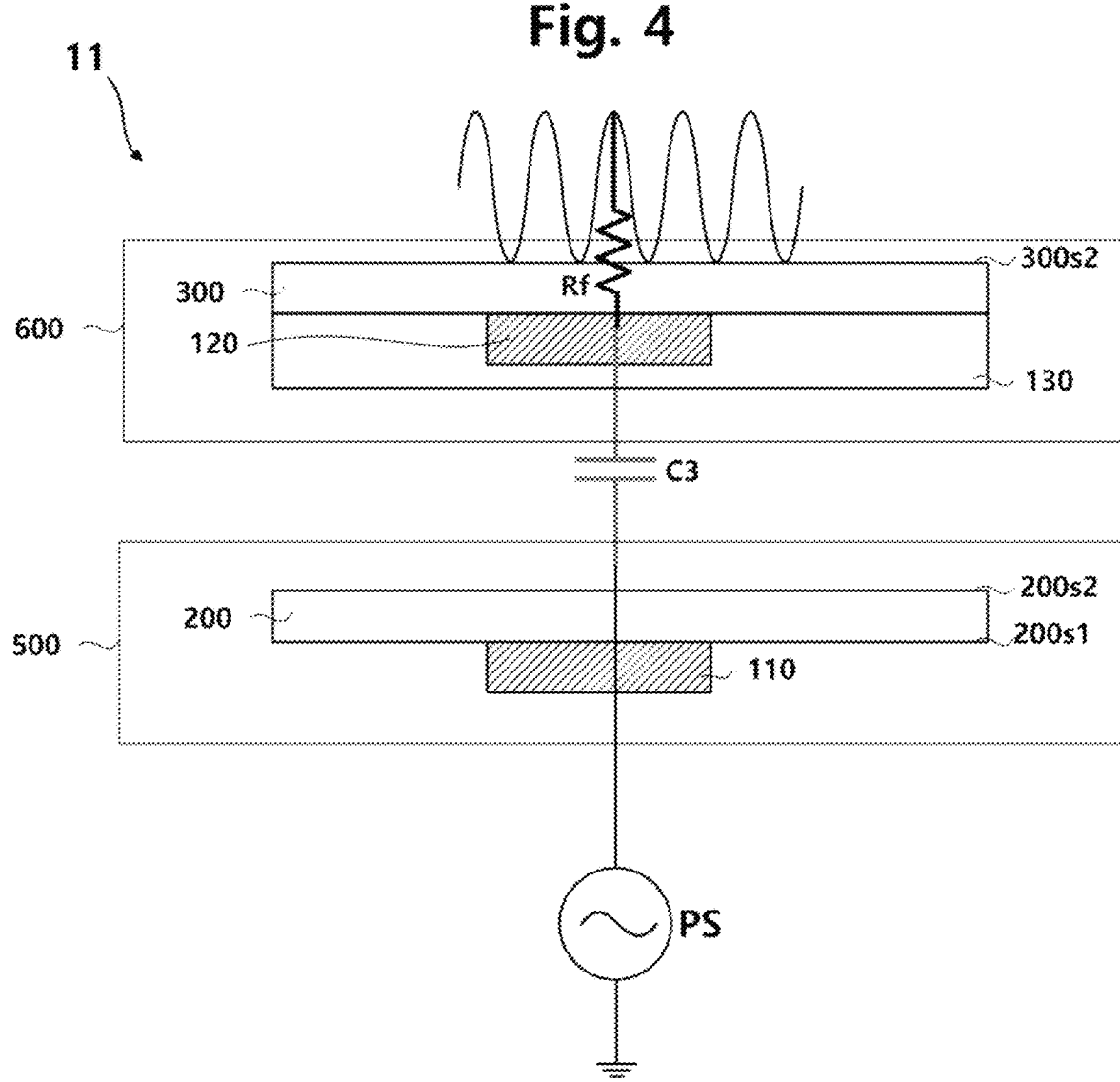

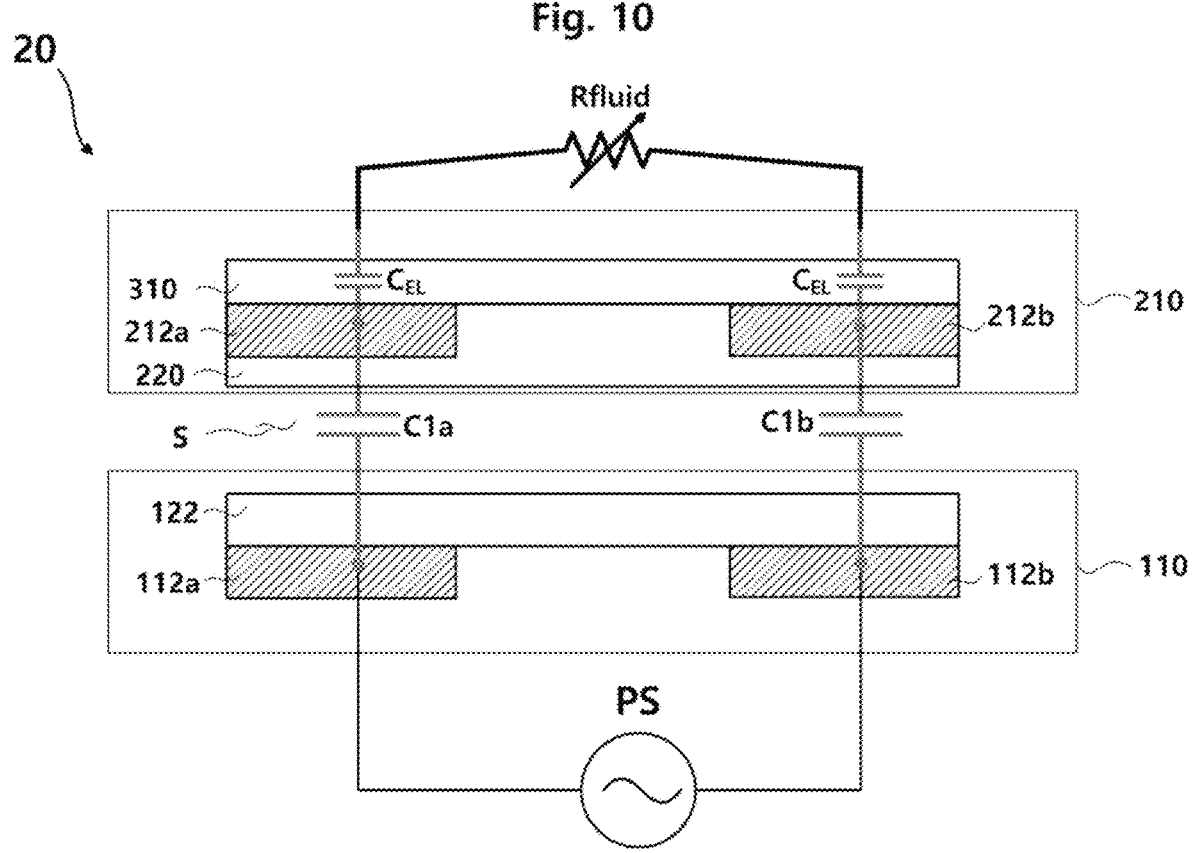

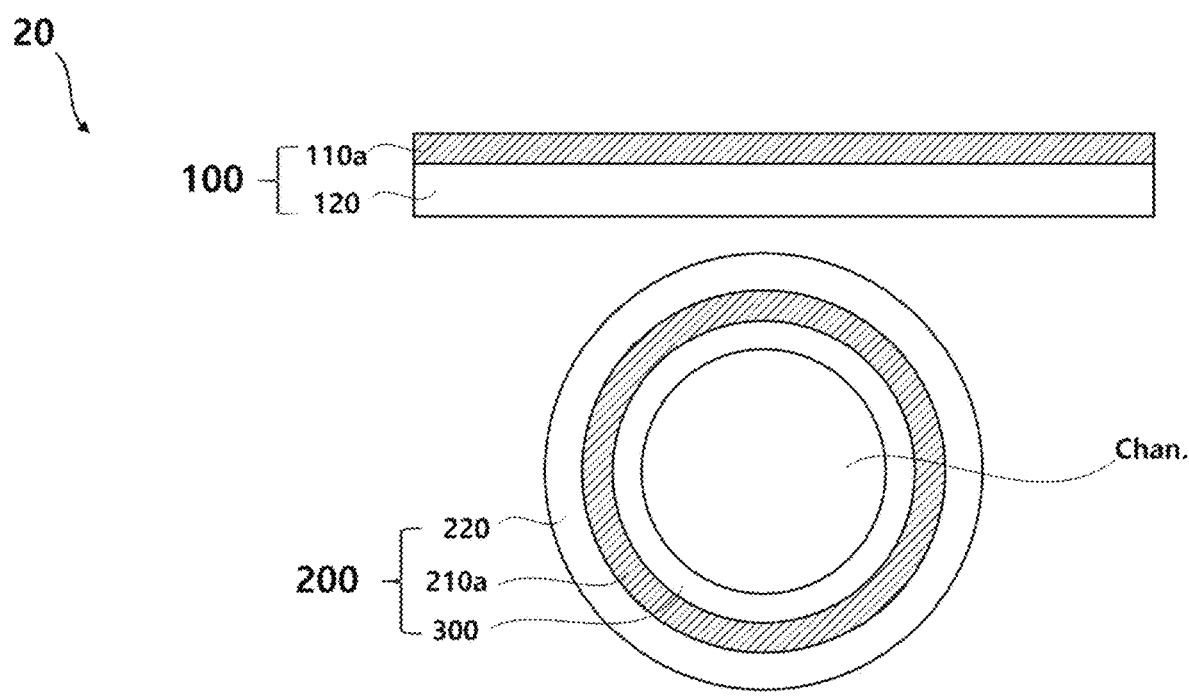

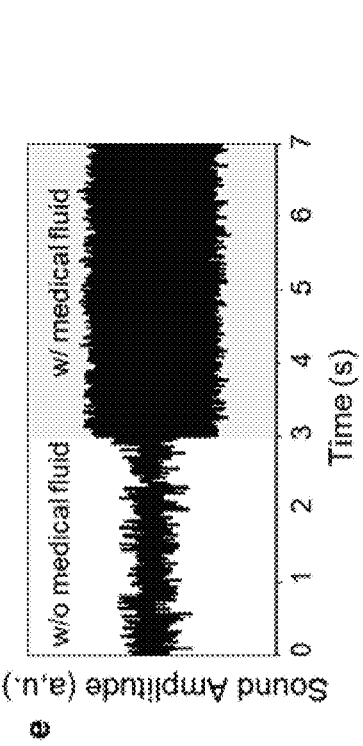
Fig. 14A
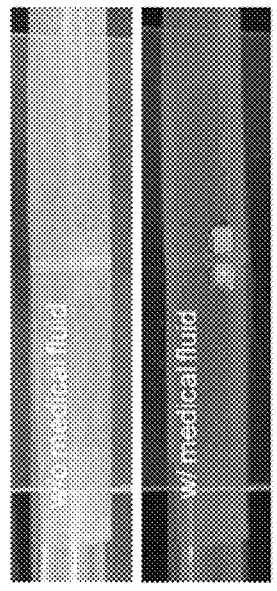
Fig. 14B
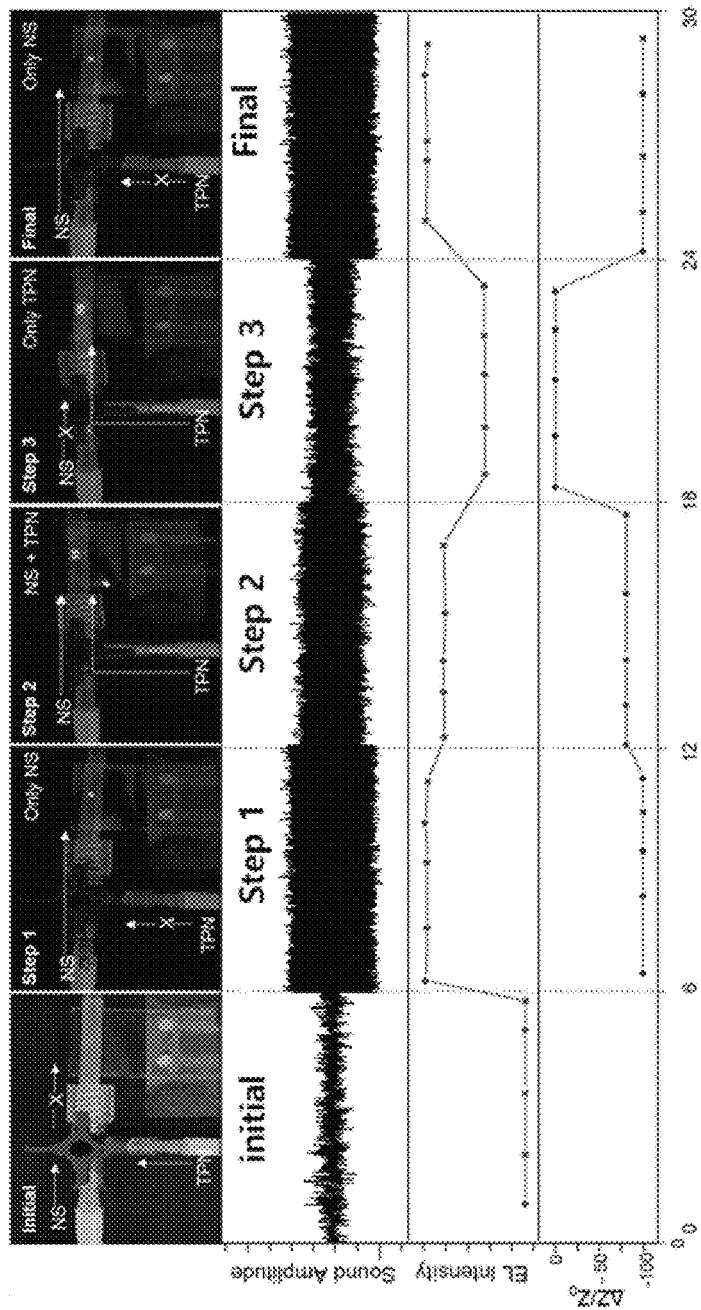
Fig. 14C
Fig. 14D
Fig. 14E
Fig. 14F

RINGER SOLUTION DETECTION DEVICE AND DETECTION DEVICE

CROSS-REFERENCE TO RELATED APPLICATIONS

This application claims priority to Korean Patent Application Nos. 10-2021-0144731 (filed on Oct. 27, 2021) and 10-2021-0144733 (filed on Oct. 27, 2021), which are all hereby incorporated by reference in their entirety.

BACKGROUND

The present invention relates to a detection device and a fluid detection device.

Stimulus detection devices according to the related art detect stimuli using detection materials of which characteristics are changed in response to specific stimuli such as temperature and pressure. The stimulus detection device according to the related art quantifies the detected stimulus as a digital value and displays a value corresponding the digital value on a display device or notifies the magnitude, strength, and the like of the stimulus as a volume corresponding to the detected stimulus using a speaker.

That is, the stimulus detection device according to the related art includes devices for converting the detected stimulus into a corresponding digital value to notify the digital value to the outside in addition to a device for detecting a stimulus.

According to the related art, when compared to the device for detecting a stimulus, since the device for converting the detected stimulus into the digital value to notify the digital value to the outside are additionally provided, there are difficulties in that a price is high and power consumption is large.

In addition, when about 10% of a fluid in the human body is lost, the functions of the brain and heart are rapidly reduced due to severe dehydration, and when water loss of 20% or more occurs, the life of a patient is at risk. That is, the fluid is essential for supplying drugs and nutrients to patients.

A normal person receives the necessary water and nutrients through a meal, but when it a person is difficult to eat due to health problems or requires continuous drug administration, a fluid is supplied through a vein.

The person for administering a fluid should select and provide a ringer solution, and when a fluid to be administered is incorrectly selected, a medical accident may occur. In the related art, a fluid is completely relied on the person for administering a fluid to administer the fluid into a patient's vein. Therefore, there is a difficulty in that a mistake by the person for administering a fluid may cause a medical accident.

One of the problems to be solved by the present invention is to solve the difficulties of the related art. That is, an object according to the present invention are to provide a stimulus detection device which detects a stimulus, informs a user of the detected stimulus visually, acoustically, and tactfully using provided power without digitizing the stimulus, detects the characteristics of a fluid, and informs the user of the characteristics of the detected fluid visually, tactilely, and acoustically so that a correct fluid is administered.

SUMMARY

According to an aspect of the present invention, there is provided a detection device including a substrate, first electrodes formed on a first surface of the substrate, a responsive layer, and second electrodes formed on a first surface of the responsive layer. Each of the second electrodes may be capacitively coupled to one of the first electrodes and each second electrode may be connected to a power supply to provide driving power.

The detection device may detect electrical characteristics of a fluid located on a second surface of the responsive layer.

The detection device may further include a stimulus detection layer positioned on the responsive layer and configured to detect a stimulus.

The stimulus detection layer may be a pressure detection layer of which electrical characteristics change with pressure.

The pressure detection layer may have a pyramid structure and include any one among PVDF-HFP, and EMIMTFSI.

The stimulus detection layer may be a thermal detection layer of which electrical characteristics change with temperature.

The thermal detection layer may include any one or more among PEO, LiTFSI, and PEGDME.

The responsive layer may respond by varying an intensity of light emission, an intensity of vibration, and a sound amplitude according to the electrical characteristic.

The responsive layer may include a piezoelectric material in which a field induced electroluminescent (EL) phosphor is dispersed.

The piezoelectric material may be a fluorinated polymer.

The substrate may be a tube.

According to another aspect of the present invention, there is provided a detection device that includes a power transmitter including a first substrate and a first electrode formed on the first substrate, and a detector including a second substrate, a second electrode formed on the second substrate, and a responsive layer configured to generate vibrations, light emission, and sound in response to a stimulus. The first electrode may be capacitively coupled to the second electrode to provide driving power to the second electrode, a pattern formed on an object positioned on the responsive layer may form an electric field corresponding to the pattern in the responsive layer, and the responsive layer may respond to the electric field.

According to still another aspect of the present invention, there is provided a fluid detection device that includes a detector including a tube-shaped substrate, second electrodes formed on an inner surface of the tube-shaped substrate, and a responsive layer configured to generate vibrations, light emission, and sound according to the characteristics of a fluid by being brought into contact with the fluid flowing through the tube-shaped substrate, and a power transmitter which includes an external substrate and first electrodes formed on the external substrate and connected to a power supply (PS) and which is positioned to be spaced apart from the detector. Each of the second electrodes may be capacitively coupled to one of the first electrodes and may receive power from the power transmitter.

The tube-shaped substrate may be fitted and coupled to a tube through which the fluid flows.

The responsive layer may respond by varying an intensity of light emission, an intensity of vibration, and a sound amplitude according to the electrical characteristic.

The responsive layer may include a piezoelectric material in which a field induced electroluminescent (EL) phosphor is dispersed.

The piezoelectric material may be a fluorinated polymer.

The field induced EL phosphor may be any one among ZnS:Mn, ZnS:Cu, and ZnS:Al.

The external substrate may be a transparent substrate, and the first electrode may be a transparent electrode.

The first electrode formed on the external substrate may be formed of a conductive polymer.

BRIEF DESCRIPTION OF THE DRAWINGS

FIG. 4 is a cross-sectional view illustrating an overview of the detection device according to another embodiment of the present invention.

FIG. 10 is a schematic cross-sectional view illustrating the fluid detection device according to the present embodiment cut in a direction parallel to a direction in which a fluid flows.

FIG. 11 is a cross-sectional view illustrating the fluid detection device cut in a direction perpendicular to the direction in which the fluid flows.

FIG. 14A is a diagram illustrating a light emission state in which a fluid does not flow and a light emission state in which the fluid flows provided by the fluid detection device according to the present embodiment, FIG. 14B is a diagram illustrating a sound amplitude provided by the fluid detection device according to the present embodiment when the fluid does not flow, FIG. 14C is a diagram illustrating a state in which physiological saline and a TPN fluid are connected to the fluid detection device of the present invention through a three-way valve, FIG. 14D is a diagram illustrating sound amplitudes of an initial state, step 1, step 2, step 3, and a final state over time, FIG. 14E is a diagram illustrating light emission intensity over time, and FIG. 14F is a diagram illustrating a change in impedance.

DETAILED DESCRIPTION

First Embodiment

Figure 1:
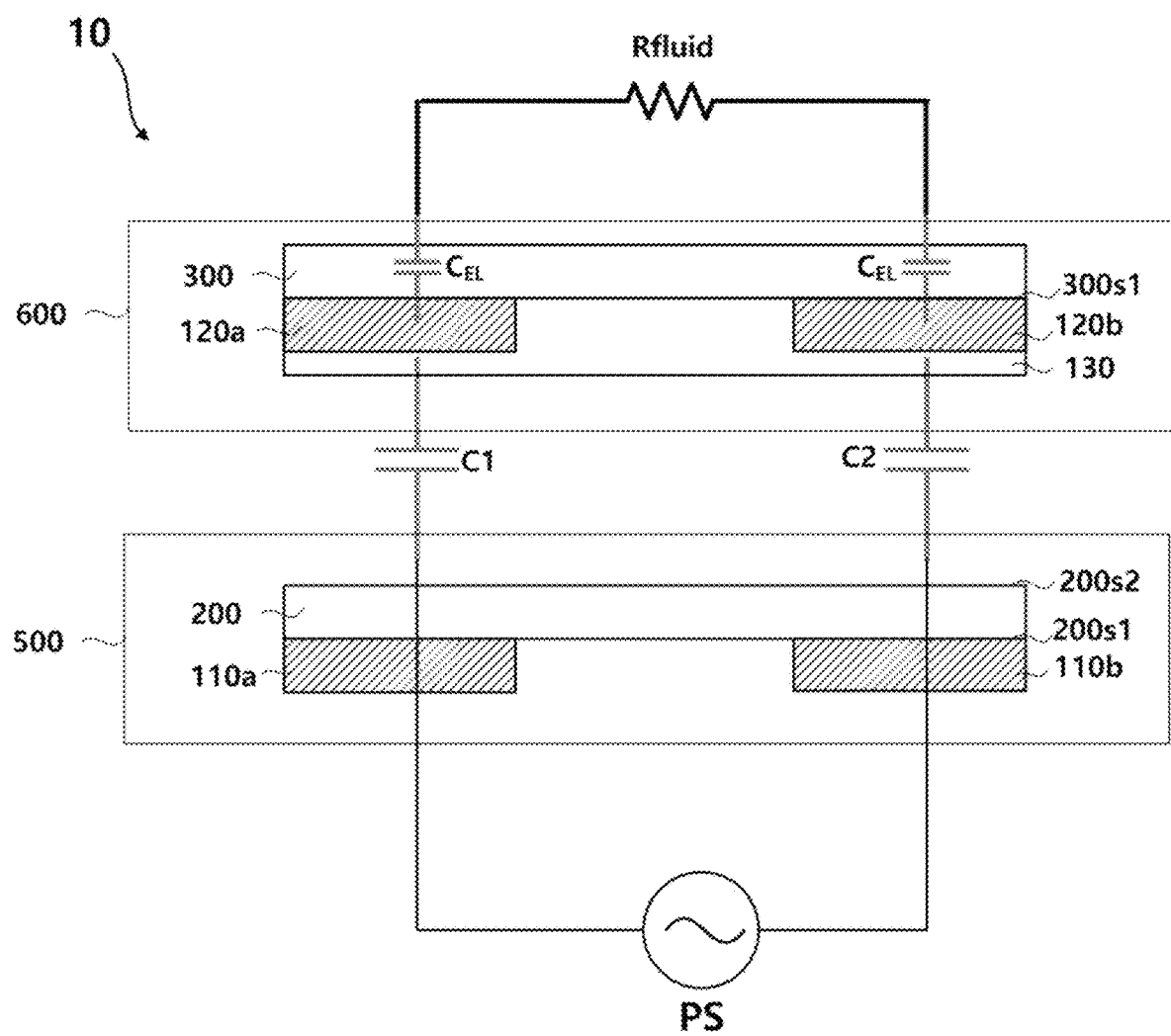
FIG. 1 is a schematic cross-sectional view illustrating a detection device according to the present embodiment.

Hereinafter, a detection device according to the present embodiment will be described with reference to the accompanying drawings. FIG. 1 is a schematic cross-sectional view illustrating a detection device 10 according to the present embodiment. Referring to FIG. 1, the detection device 10 includes a power transmitter 500 including a first substrate 200 with a first surface 200s1 and a second surface 200s2 and first electrodes 110a and 110b positioned on the first substrate 200, and a detector 600 including a second substrate 130, second electrodes 120a and 120b positioned on the second substrate 130, and a responsive layer 300 configured to generate vibrations, light emission, and sound in response to a stimulus.

Each of the second electrodes 120a and 120b are capacitively coupled to one of the first electrodes 110a and 110b and the first electrodes 110a and 110b are connected to a power supply PS to provide driving power.

The power transmitter 500 includes the first substrate 200 and the first electrodes 110a and 110b. The first electrodes 110a and 110b are positioned on the first substrate 200. In one embodiment, the first substrate 200 may be a transparent insulating substrate and may be made of, for example, a resin material such as polyethylene terephthalate (PET) or polyethylene (PE).

The first electrodes 110a and 110b are positioned on the first substrate 200 and connected to the power supply PS. In addition, the first electrodes 110a and 110b may be formed of a transparent conductor, for example, a complex oxide such as indium tin oxide (ITO) or indium zinc oxide (IZO).

The detector 600 includes the second substrate 130, the second electrodes 120a and 120b positioned on the second substrate 130, and the responsive layer 300 configured to generate vibrations, light emission, and sound in response to a stimulus. The responsive layer 300 responds visually, audibly, and tactilely according to the electrical characteristics of a material on the responsive layer 300. As one example, the responsive layer 300 may be a pattern formed by dispersing a field induced electroluminescent (EL) phosphor in a piezoelectric material.

When fluids with different characteristics flow on the responsive layer 300, due to an electric field formed to correspond to the impedance of the fluids, the field induced EL phosphor may emit light to visually inform a user of the characteristics of the fluids. For example, the field induced EL phosphor may be any one or more among ZnS:Mn, ZnS:Cu, and ZnS:Al.

In addition, the piezoelectric material included in the responsive layer 300 may respond to an electrical signal provided in accordance with the impedance of the fluid to vibrate and generate a sound, thereby tactilely and audibly informing the user of the characteristics of the fluid. The piezoelectric material may be a fluorinated polymer and, for example, may be any one or more among PVDF, PVDF-TrFE, PVDF-TrFE-CFE, PVDF-HFP, and a mixture thereof.

The second electrodes 120a and 120b are positioned on the responsive layer 300. As one example, the second electrodes 120a and 120b may each be made of a conductive polymer material. For example, the second electrodes 120a and 120b may each be any one or more among a metal pattern such as aluminum (Al), silver (Ag), copper (Cu), or a conductive polymer material such as PEDOT:PSS.

The power transmitter 500 and the detector 600 may be spaced apart from each other to form a gap. As one example, a gap S may be filled with of air, and as another example, the gap S may be filled with a dielectric material capable of transmitting power output from the power supply PS to the detector 600 in the form of an electric field.

Figure 2:
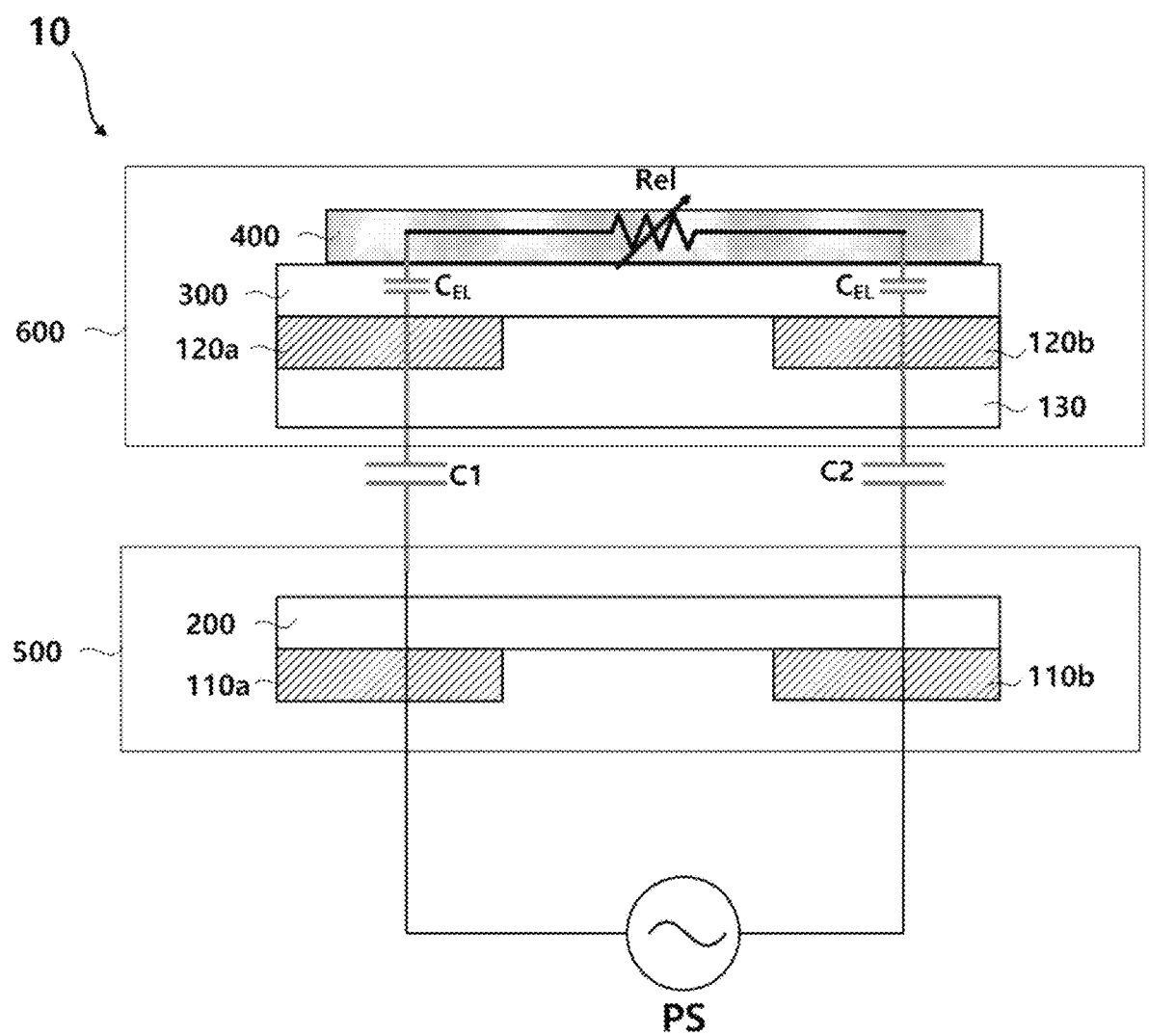
FIG. 2 is a diagram illustrating a detection device according to another embodiment.

FIG. 2 is a diagram illustrating a detection device 10 according to another embodiment. Referring to FIG. 2, the detection device 10 further includes a stimulus detection layer 400 positioned on a responsive layer 300. Referring to FIG. 2, the stimulus detection layer 400 detects a stimulus provided from the outside, and electrical characteristics change in response to the detected stimulus. As in the embodiment illustrated in FIG. 2, electrical characteristics of the stimulus detection layer 400, such as resistance and impedance, change in response to the detected stimulus.

Figure 3A:
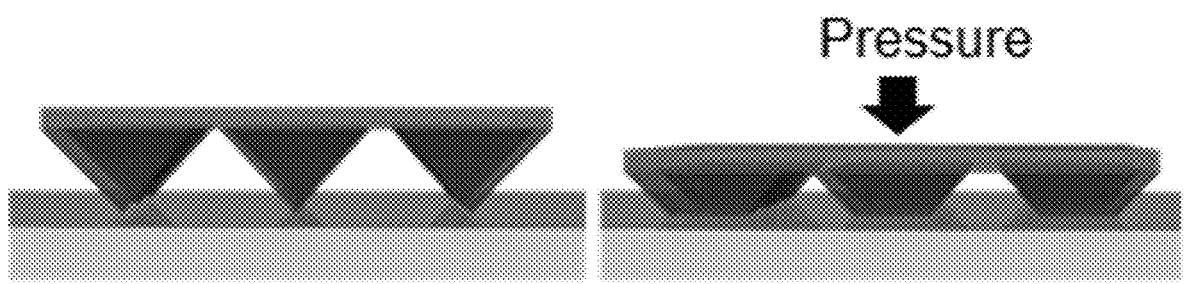
FIG. 3A is a schematic diagram illustrating the operation of a pressure detection layer.
Figure 3B:
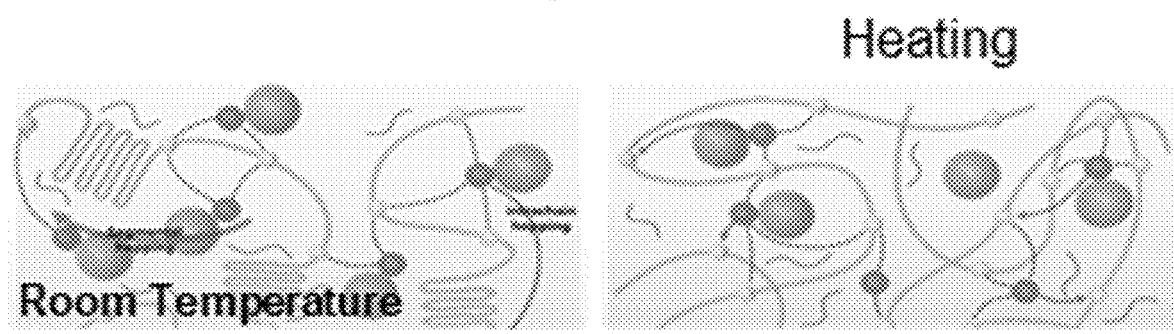
FIG. 3B is a schematic diagram illustrating a structure of a temperature detection layer.

As one example, the stimulus detection layer 400 may be any one or more of a pressure detection layer and a temperature detection layer. FIG. 3A is a schematic diagram illustrating the operation of a pressure detection layer, and FIG. 3B is a schematic diagram illustrating a structure of a temperature detection layer. Referring to FIG. 3A, the pressure detection layer may include any one or more among PVDF-HFP, PVDF-TrFE-CFE, EMIMTFSI, EMIMTFSA, and LiTFSI and may be formed in a pyramid structure in the form of a gel.

When pressure is not applied to the pressure detection layer, as shown in the left drawing of FIG. 3A, the pressure detection layer is positioned while maintaining the pyramid structure, whereas when pressure is applied to the pressure detection layer, as shown in the right drawing of FIG. 3A, the gel having the pyramid structure is pressed in a direction opposite to a direction in which the pressure is applied, and electrical characteristics of a material are changed. For example, when pressure is applied to the pressure detection layer and thus the gel having the pyramid structure is deformed, an electrical resistance value is decreased compared to before pressure is applied.

FIG. 3B is a schematic diagram illustrating a structure of a temperature detection layer. Referring to FIG. 3B, the temperature detection layer may include any one or more among PEO, PVDF-TrFE-CFE, PEGDME, LiTFSI, EMIMTFSI, and EMIMTFSA and may be in a gel state.

In the temperature detection layer, as shown in the left drawing of FIG. 3B, molecules of the temperature detection layer are positioned in a dense state at room temperature. However, as shown in the right drawing of FIG. 3B, as the temperature is increased, the dense molecular structure is released and thus electrical characteristics change. As one example, when the temperature detection layer is heated, an electrical resistance value is decreased compared to before heating.

The examples illustrated in FIGS. 1 and 2 are not mutually exclusive. That is, the pressure detection layer and the temperature detection layer may be positioned apart from each other, and the responsive layer 300 may be positioned apart therefrom. Accordingly, the detection device 10 may simultaneously detect the pressure, temperature, and characteristics of a fluid.

Hereinafter, the operation of the detection device 10 will be described with reference to FIGS. 1 and 2. As exemplified in FIG. 1, the first electrode 110a and the second electrode 120a are capacitively coupled to form a capacitor C1, and the first electrode 110b and the second electrode 120b are capacitively coupled to form a capacitor C2. The capacitor C1 includes the first electrode 110a and the second electrode 120a, and the capacitor C2 includes the first electrode 110b and the second electrode 120b. As described above, the first electrodes 110a and 110b may be spaced apart from the second electrodes 120a and 120b.

The power supply PS is connected to the first electrode 110a of the first capacitor C1 and the first electrode 110b of the second capacitor C2. Power output from the power supply PS is supplied to the first electrodes 110a and 110b that supplies the power to the second electrodes 120a and 120b, respectively, in the form of an electric field.

In the embodiment illustrated in FIG. 1, the second electrodes 120a and 120b and the fluid on the responsive layer 300 form polarities of a responsive layer capacitor $C_{EL}$, and the responsive layer 300 forms a dielectric material of the responsive layer capacitor $C_{EL}$.

The power output from the power supply PS is provided to the responsive layer capacitor $C_{EL}$ through the second electrodes 120a and 120b. Characteristics, such as electrical resistance and impedance, of the fluid on the responsive layer 300 vary according to physical properties of the fluid. That is, when the fluid is a polar fluid such as water, electrical resistance is low, and when the fluid is a polar fluid such as acetone, hexane, or toluene, electrical resistance is high.

Due to electrical resistance Rfluid formed according to the type of fluid, the magnitude of a voltage formed in the responsive layer 300 is different. Thus, according to the characteristics of the fluid, the field induced EL phosphor included in the responsive layer 300 may emit light and provide light having an intensity corresponding to the characteristics of the fluid.

In addition, since the magnitude of the voltage formed in the responsive layer 300 corresponds to the type of fluid, the piezoelectric material included in the responsive layer 300 vibrates in response to the type of fluid and generates a sound. Accordingly, it is possible to tactilely and audibly inform the user of the characteristics of the fluid.

In the embodiment illustrated in FIG. 2, when the stimulus detection layer 400 is a pressure detection layer, and when a fluid flows on the stimulus detection layer 400, the pressure applied to the stimulus detection layer 400 decreases according to a flow rate of the fluid. Therefore, a resistance value formed in the stimulus detection layer 400 changes, and thus the luminance of light and the intensity of vibration and sound provided by the responsive layer 300 are changed to correspond to the changed resistance value. From the luminance of light and the intensity of vibration and sound provided by the responsive layer 300, the user may identify the flow rate of the fluid flowing on the stimulus detection layer 400 and the intensity of the pressure applied to the stimulus detection layer 400.

In the embodiment illustrated in FIG. 2, when the stimulus detection layer 400 is a temperature detection layer, a temperature of the environment where the stimulus detection layer 400 is positioned may be higher or lower than room temperature. Alternatively, when the fluid flows on the stimulus detection layer 400, a temperature of the fluid may be higher or lower than room temperature.

According to the temperature applied to the stimulus detection layer 400, a resistance value formed in the stimulus detection layer 400 changes, and thus the luminance of light and the intensity of vibration and sound provided by the responsive layer 300 are changed to correspond to the changed resistance value. From the luminance of light and the intensity of vibration and sound provided by the responsive layer 300, the environment where the stimulus detection layer 400 is positioned or the temperature of the fluid flowing on the stimulus detection layer 400 may be identified.

Hereinafter, another embodiment of the present invention will be described with reference to FIG. 4. However, descriptions of components which are the same as or similar to those of the above-described embodiment will be omitted herein. FIG. 4 is a cross-sectional view illustrating an overview of a detection device 11 according to another embodiment of the present invention. Referring to FIG. 4, the detection device 11 includes a power transmitter 500 including a first substrate 200 and a first electrode 110 positioned on the first substrate 200, and a detector 600 including a second electrode 120 and a responsive layer 300 configured to generate vibrations, light emission, and sound in response to a stimulus.

The second electrode 120 is capacitively coupled to the first electrode 110, and the first electrode 110 is connected to a power supply PS to provide driving power to the second electrode 120.

The power transmitter 500 includes the first substrate 200 and the first electrode 110. The first electrode 110 is positioned on the first substrate 200. In one embodiment, the first substrate 200 may be a transparent insulating substrate and may be made of, for example, a resin material such as PET or PE.

The first electrode 110 is positioned on the first substrate 200 and connected to the power supply PS. In addition, the first electrode 110 may be formed of a transparent conductor, for example, a complex oxide such as ITO or IZO.

The detector 600 includes the second substrate 130, the second electrode 120 positioned on the second substrate 130, and the responsive layer 300 configured to generate vibrations, light emission, and sound in response to a stimulus. The responsive layer 300 responds visually, audibly, and tactilely according to the electrical characteristics of a material positioned on the responsive layer 300. As one example, the responsive layer 300 may be a pattern formed by dispersing a field induced EL phosphor in a piezoelectric material. FIG. 4 illustrates a case in which a finger is positioned on an upper portion of the responsive layer 300, and ridges and valleys of a fingerprint are exaggerated for easy understanding.

Hereinafter, an example in which a finger is positioned on the upper portion of the responsive layer 300 and a fingerprint of the finger is detected will be described. However, this is merely an embodiment of the present invention and is not intended to limit the scope of the present invention. Therefore, an object on which a pattern is formed in contact with or spaced apart from an upper surface 300s2 of the responsive layer 300 may be positioned on the upper portion of the responsive layer 300, and the detection device 11 according to the present embodiment may detect the pattern of the object. In the example shown in the drawing, when the finger comes into contact with the upper surface 300s2 of the responsive layer 300, since the human body has large electrical capacitance, the fingerprint of the finger is equivalent to being electrically connected to the ground.

When the finger comes into contact with the upper portion of the responsive layer 300, a ridge of the fingerprint is brought into contact with the upper portion of the responsive layer 300, whereas a valley of the fingerprint is not brought into contact with the upper portion of the responsive layer 300. Accordingly, the ridge and the valley form different electrical resistances Rf in relation to the second electrode 120, and thus electric fields of different magnitudes are formed in the responsive layer 300.

Accordingly, the field induced EL phosphor may emit light according to the strength of an electric field formed in the responsive layer 300 to visually inform the user of the characteristics of a fluid, and the piezoelectric material included in the responsive layer 300 may vibrate in response to the strength of the electric field and generate a sound to inform the user whether the finger has come into contact with the responsive layer 300.

The second electrode 120 is positioned on the responsive layer 300. As one example, as described above, the second electrode 120 may be made of a conductive polymer material, and for example, the second electrode 120 may be formed of any one or more among a metal pattern formed of Al, Ag, or Cu, and a conductive polymer material such as PEDOT:PSS.

The power transmitter 500 and the detector 600 may be spaced apart from each other to form a gap. As one example, a gap S may be filled with air, and as another example, the gap S may be filled with a dielectric material capable of transmitting power output from the power supply PS to the detector 600 in the form of an electric field.

Experimental Example

Figure 5A:
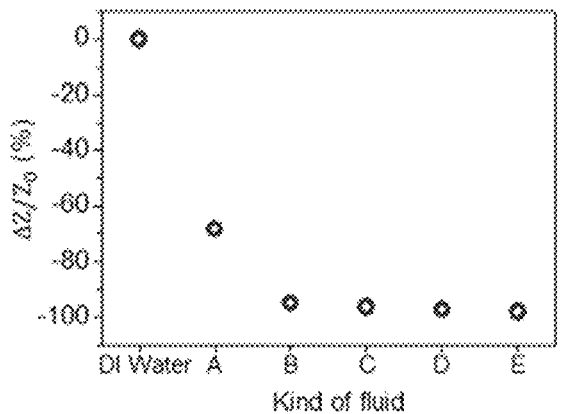
FIG. 5A is a diagram showing normalized impedance changes of fluids when deionized (DI) water and five types of fluids, which include Combiflex Peri Inj. fluid A and fluid B, and Winuf Peri Inj. fluid A, fluid B, and fluid C in addition to a glucose fluid, a fat emulsion ingredient, an amino acid fluid, and an electrolyte fluid constituting a total parenteral nutrition (TPN) fluid, are provided.

Hereinafter, an experimental example of the detection device according to the present embodiment will be described with reference to FIGS. 5 to 9. FIG. 5A is a diagram showing normalized impedance changes of fluids when DI water and five types of fluids, which include Combiflex Peri Inj. fluid A and fluid B, and Winuf Peri Inj. fluid A, fluid B, and fluid C in addition to a glucose fluid, a fat emulsion ingredient, an amino acid fluid, and an electrolyte fluid constituting a total parenteral nutrition (TPN) fluid, are provided, FIG. 5B is a diagram illustrating the luminance of light provided by a responsive layer 300, and FIG. 5C is a diagram illustrating the intensity and wavelength of light provided by the responsive layer 300.

Referring to FIG. 5A, it can be seen that a change in impedance of the DI water is close to zero, and a change in impedance is large in the order of fluids B, C, D, and E. As shown in FIG. 5B, when the fluids flow, it can be seen that the luminance of light provided by the responsive layer 300 increases in the order of the increasing impedance change.

Figure 5B:
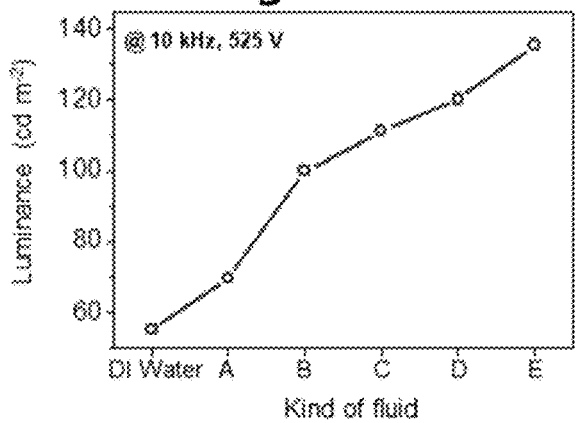
FIG. 5B is a diagram illustrating the luminance of light provided by a responsive layer (300)
Figure 5C:
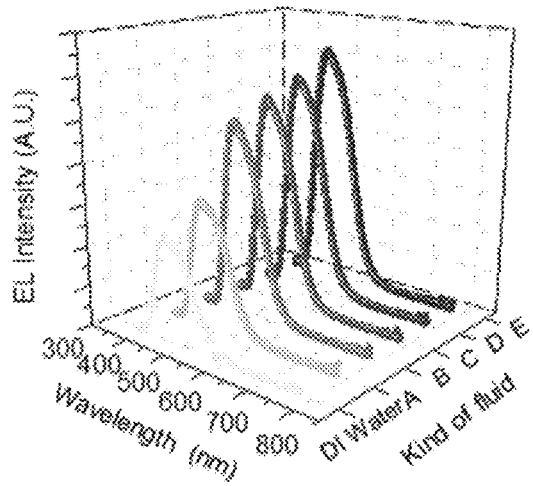
FIG. 5C is a diagram illustrating the intensity and wavelength of light provided by the responsive layer (300).

The luminance of light provided by the responsive layer 300 increases in the order of the increasing impedance change as shown in FIG. 5B, whereas, as shown in FIG. 5C, it can be seen that a peak wavelength of the light was approximately 450 nm in common and it can be confirmed that this is due to the characteristics of the field induced EL phosphor dispersed in the responsive layer 300.

Figure 6A:
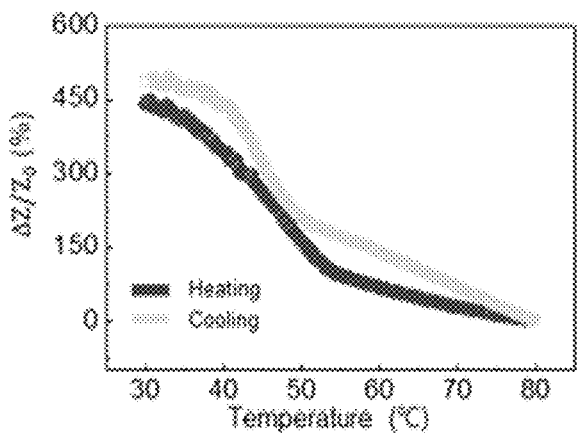
FIG. 6A is a diagram illustrating normalized impedance changes of a stimulus detection layer in a heating process and a cooling process.
Figure 6B:
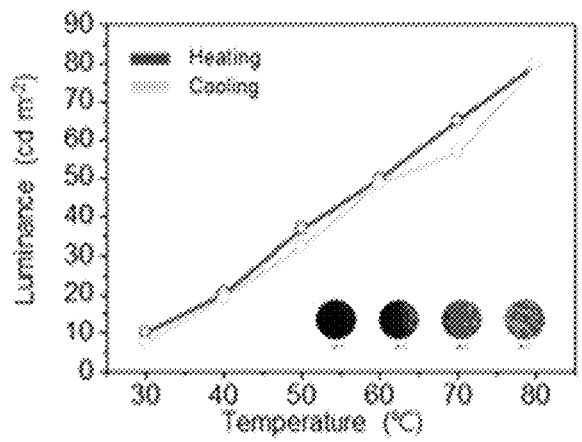
FIG. 6B is a diagram illustrating the luminance of light provided by the responsive layer (300) in the heating process and the cooling process.
Figure 6C:
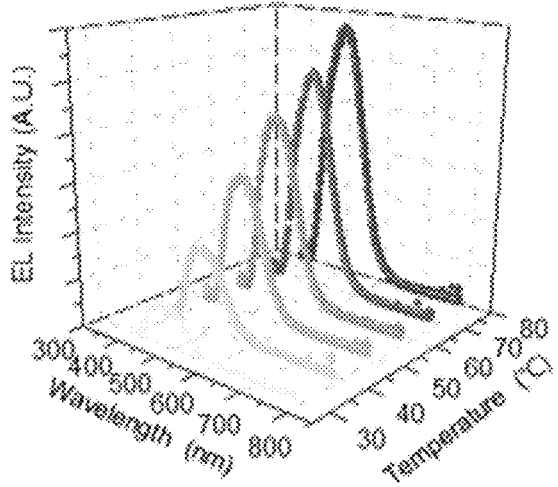
FIG. 6C is a diagram illustrating the intensity and wavelength of light provided by the responsive layer (300) in the heating process and the cooling process.

FIG. 6A is a diagram illustrating normalized impedance changes of the stimulus detection layer in a heating process and a cooling process, FIG. 6B is a diagram illustrating the luminance of light provided by the responsive layer 300 in the heating process and the cooling process, and FIG. 6C is a diagram illustrating the intensity and wavelength of light provided by the responsive layer 300 in the heating process and the cooling process.

Referring to FIG. 6A, it can be seen that changes in impedance according to a temperature change in the heating process and the cooling process are not completely the same, whereas a change in impedance is close to zero at high temperature and is large at low temperature. As described above, as shown in FIG. 6B, when the stimulus detection layer 400 was exposed to the temperature change, it can be seen that the luminance of light provided by the responsive layer 300 is small at low temperature and increases as the temperature increases.

In addition, the luminance of light provided by the responsive layer 300 increases as the temperature increases as shown in FIG. 6B, whereas, as shown in FIG. 6C, it can be seen that a peak wavelength of the light is approximately 450 nm in common and it can be confirmed that this is similarly due to the characteristics of the field induced EL phosphor dispersed in the responsive layer 300.

Figure 7A:
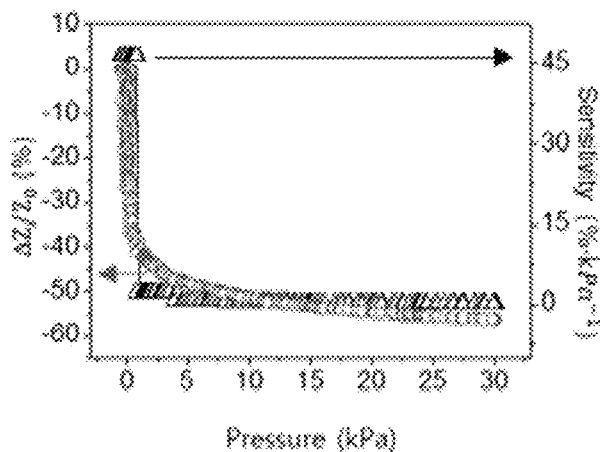
FIG. 7A is a diagram illustrating a normalized impedance change of the stimulus detection layer according to a pressure applied to a stimulus detection layer (400)
Figure 7B:
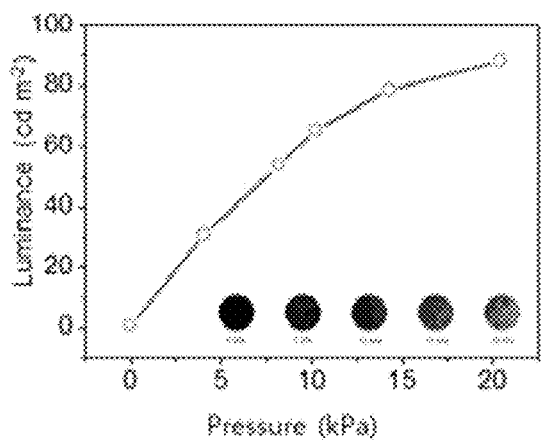
FIG. 7B is a diagram illustrating the luminance of light provided by the responsive layer according to the pressure applied to the stimulus detection layer (400)
Figure 7C:
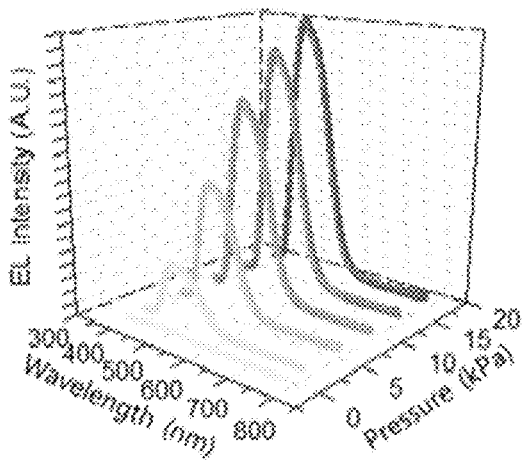
FIG. 7C is a diagram illustrating the intensity and wavelength of light provided by the responsive layer according to the pressure applied to the stimulus detection layer.

FIG. 7A is a diagram illustrating a normalized impedance change of the stimulus detection layer according to a pressure applied to a stimulus detection layer 400, FIG. 7B is a diagram illustrating the luminance of light provided by the responsive layer according to the pressure applied to the stimulus detection layer 400, and FIG. 7C is a diagram illustrating the intensity and wavelength of light provided by the responsive layer according to the pressure applied to the stimulus detection layer 400.

Referring to FIG. 7A, it can be seen that the largest change in impedance occurred when a pressure of up to 2.5 kPa was applied in the absence of a stimulus, and thereafter, the impedance changes with a gentle slope according to a pressure as the stimulus is provided. As shown in FIG. 7B, when the pressure was applied to the stimulus detection layer 400, it can be seen that luminance of light provided by the responsive layer 300 was small at a low pressure and was increased as the pressure was increased.

In addition, the luminance of light provided by the responsive layer 300 increases as the pressure increases as shown in FIG. 7B, whereas, as shown in FIG. 7C, it can be seen that a peak wavelength of the light is approximately 450 nm in common and it can be confirmed that this is similarly due to the characteristics of the field induced EL phosphor dispersed in the responsive layer 300.

Figure 8A:
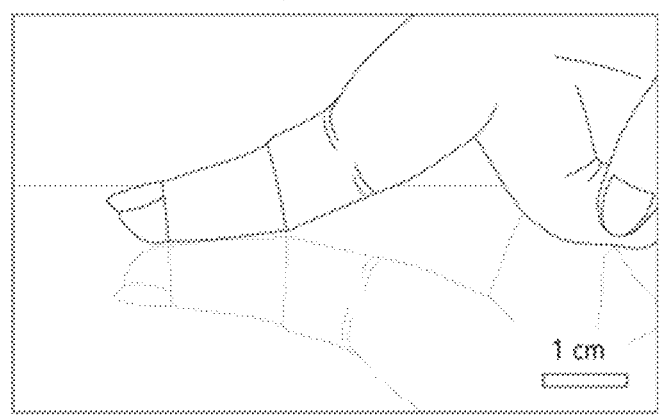
FIG. 8A is a diagram illustrating a state in which a power transmitter on a bottom surface and a finger are used while a detector is wrapped around the finger in the form of a band.
Figure 8B:
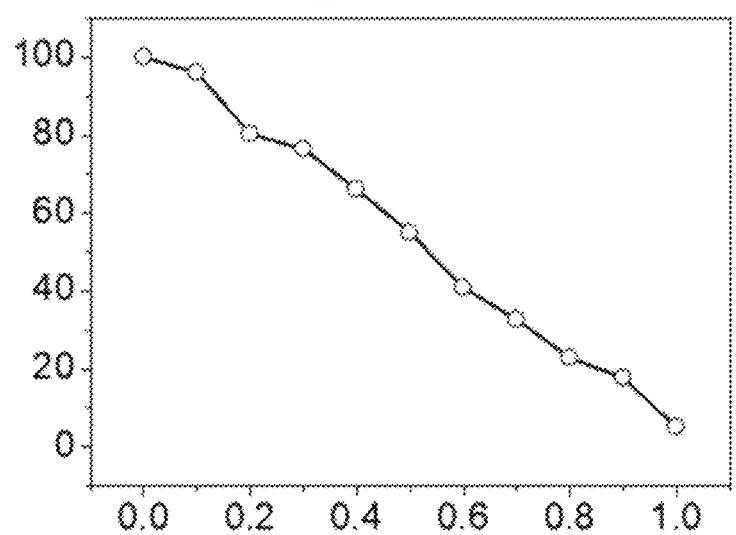
FIG. 8B is a diagram illustrating light emission intensity (A.U.) of the detector with respect to a separation distance (mm) between the power transmitter and the detector.

FIG. 8A is a diagram illustrating a detection device according to still another embodiment that shows a state in which a power transmitter on a bottom surface and a finger are used while a detector 600 is wrapped around the finger in the form of a band. FIG. 8B is a diagram illustrating a light emission intensity (A.U.) of the detector with respect to a separation distance (mm) between the power transmitter and the detector. As shown in the drawings, it can be seen that the highest light emission intensity is exhibited when the power transmitter and the sensing unit are in close contact with each other, and the light emission intensity decreases almost linearly as the separation distance increases.

Figure 8C:
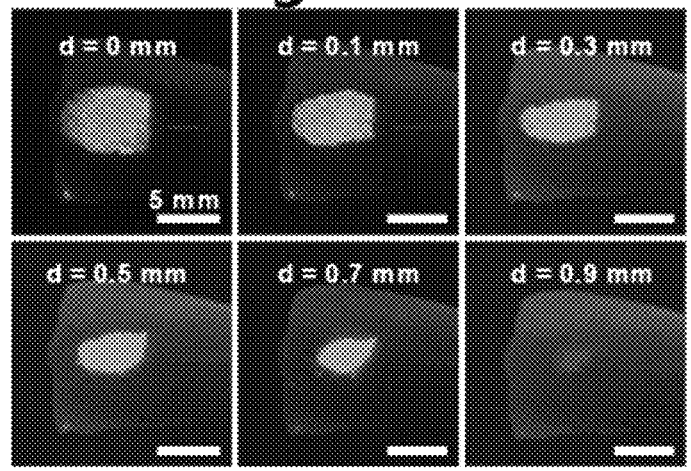
FIG. 8C is a diagram illustrating the light emission of the detector with respect to the separation distance (mm) between the power transmitter and the detector.

FIG. 8C is a diagram illustrating the light emission of the detector with respect to the separation distance (mm) between the power transmitter and the detector. As shown in the drawing, it can be confirmed that, when the power transmitter and the sensing unit were in close contact with each other, a fingerprint of a user may be identified. It can be seen that the light emission intensity of the detector decreases as the separation distance increases.

FIG. 9 shows diagrams illustrating power transmission data of the detection device according to the present embodiment. In the present embodiment, FIG. 9A is a schematic diagram illustrating a state in which a variable load resistor is connected to a position of a stimulus detector, and FIG. 9B is a diagram illustrating transferred power while changing a load resistance value. When a variable resistor was connected, power provided to the variable resistor and power provided to the entire device were measured.

Power applied to an emissive layer was calculated using a difference between the power transferred to the detection device according to the present embodiment (black line) and the power provided to the variable resistor (load resistance), and it can be seen that the smaller the load resistance, the higher the power transferred to the emissive layer. Therefore, it can be seen that, as the impedance of the stimulus detector decreases, the power transferred to the emissive layer increases so that the magnitude of the output increases.

Figure 9A:
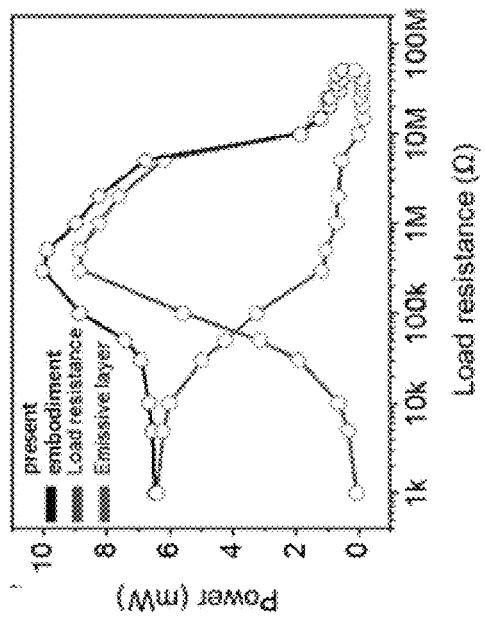
FIG. 9A is a schematic diagram illustrating a state in which a variable load resistor is connected to a position of a stimulus detector.
Figure 9B:
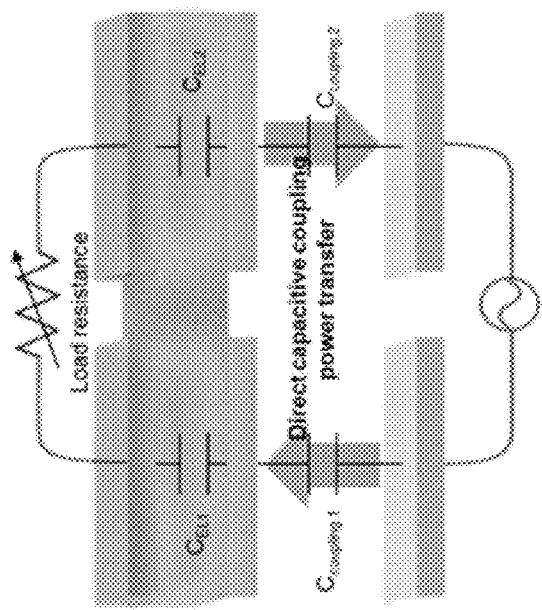
FIG. 9B is a diagram illustrating transferred power while changing a load resistance value.
Figure 9C:
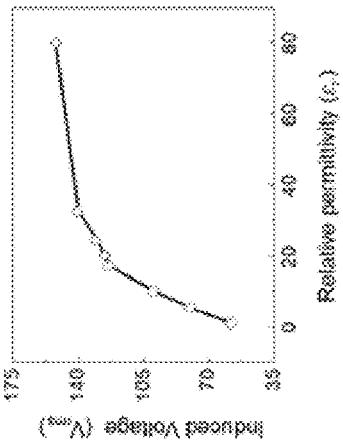
FIG. 9C is a diagram illustrating the magnitude of an induced voltage according to a distance between the power transmitter and the detector.
Figure 9D:
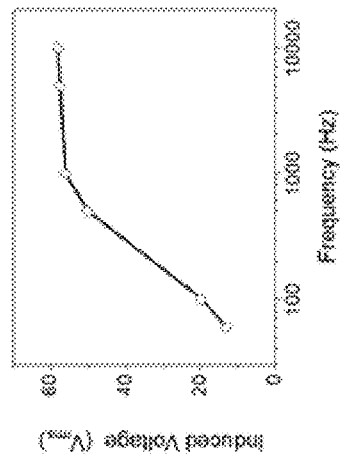
FIG. 9D is a diagram illustrating the magnitude of an induced voltage according to a frequency of an AC voltage provided by the power transmitter.
Figure 9E:
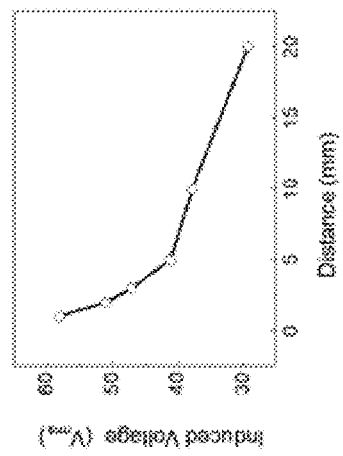
FIG. 9E is a diagram illustrating the magnitude of an induced voltage according to relative permittivity of a medium between the power transmitter and the detector.

FIG. 9C is a diagram illustrating the magnitude of an induced voltage according to a distance between the power transmitter 500 (see FIG. 1) and the detector 600 (see FIG. 1), FIG. 9D is a diagram illustrating the magnitude of an induced voltage according to a frequency of an AC voltage provided by the power transmitter, and FIG. 9E is a diagram illustrating the magnitude of an induced voltage according to relative permittivity of a medium between the power transmitter and the detector.

Referring to FIGS. 9C, 9D, and 9E, it can be seen that the magnitude of the induced voltage decreases as the distance between the power transmitter and the detector increases, and the magnitude of the induced voltage increases as a frequency increases. It can be seen that the magnitude of the induced voltage at a frequency of about 1000 Hz becomes saturated, and an increase in the magnitude of the induced voltage is not large even when the frequency increases. In addition, it can be seen that, as a material with high permittivity is positioned between the power transmitter and the detector, the magnitude of the induced voltage increases, whereas, the magnitude of the induced voltage becomes saturated after relative permittivity is approximately 50 so that, when the relative permittivity is greater than 50, an increase in the magnitude of the induced voltage is not large.

Second Embodiment

Hereinafter, a fluid detection device according to the present embodiment will be described with reference to the accompanying drawings. FIG. 10 is a schematic cross-sectional view illustrating a fluid detection device 20 according to the present embodiment cut in a direction parallel to a direction in which a fluid flows. FIG. 11 is a cross-sectional view illustrating the fluid detection device 20 cut in a direction perpendicular to the direction in which the fluid flows. Referring to FIGS. 10 and 11, the fluid detection device 20 according to the present embodiment includes a detector 210 including a tube-shaped substrate 220, second electrodes 212a and 212b formed on an inner surface of the tube-shaped substrate 220, and a responsive layer 310 configured to generate vibrations, light emission, and sound according to the characteristics of a fluid by being brought into contact with the fluid flowing through the tube-shaped substrate 220, and a power transmitter 110 which includes an external substrate 122 and first electrodes 112a and 112b formed on the external substrate 122 and connected to a power supply PS and which is positioned to be spaced apart from the detector 210. The second electrodes 212a and 212b are capacitively coupled to the first electrodes 112a and 112b, respectively, to receive power from the power transmitter 110.

The power transmitter 110 includes the external substrate 122 and the first electrodes 112a and 112b. The first electrodes 112a and 112b are positioned on the external substrate 122. As one example, the external substrate 122 may be a transparent insulating substrate and may be made of, for example, a resin material such as PET or PE.

The first electrodes 112a and 112b are positioned on any one surface of the external substrate 122 and connected to a power supply PS. In addition, the first electrodes 112a and 112b may each be formed of a transparent conductor, for example, a complex oxide such as ITO or IZO.

As one example, the external substrate 122 and the first electrodes 112a and 112b of the power transmitter 110 are each formed of a transparent material so that light provided by the responsive layer 310 may be easily observed.

The detector 210 includes the tube-shaped substrate 220 and the second electrodes 212a and 212b, and the responsive layer 310 in direct contact with the fluid. The responsive layer 300 is in direct contact with the fluid thereon to respond visually, audibly, and tactilely according to the electrical characteristics of the fluid. As one example, the responsive layer 310 may be formed by dispersing a field induced EL phosphor in a piezoelectric material.

When the fluid flows on the responsive layer 310, the field induced EL phosphor of the responsive layer 310 emits light by an electric field formed in the responsive layer 310. The strength of the electric field formed in the responsive layer 310 corresponds to the electrical resistance and impedance of the fluid. Accordingly, it is possible to visually inform the user of the electrical characteristics of the fluid. For example, the field induced EL phosphor may be any one or more among ZnS:Mn, ZnS:Cu, and ZnS:Al.

In addition, the piezoelectric material included in the responsive layer 310 may respond to an electrical signal provided in accordance with the impedance of the fluid to vibrate and generate a sound, thereby tactilely and audibly informing the user of the characteristics of the fluid. The piezoelectric material may be a fluorinated polymer and, for example, may be any one or more among PVDF, PVDF-TrFE, PVDF-TrFE-CFE, PVDF-HFP, and a mixture thereof.

The second electrodes 212a and 212b are positioned on the tube-shaped substrate 220. As one example, the second electrodes 120a and 120b may each be made of a conductive polymer material. For example, the second electrodes 120a and 120b may each be any one or more among a metal pattern formed of Al, Ag, or Cu, and a conductive polymer material such as PEDOT:PSS.

In the embodiment illustrated in FIGS. 10 and 11, the fluid detection device 20 may further include a protective layer (not shown) configured to cover and protect the second electrodes 212a and 212b. As one example, the protective layer (not shown) may prevent moisture and oxygen from the external environment from infiltrating into the second electrodes 212a and 212b and changing the nature and electrical characteristics of the second electrodes 212a and 212b.

The power transmitter 110 may be spaced apart from the detector 210. For example, a dielectric material such as air through which power output from the power supply PS may be transmitted in the form of an electric field may be positioned between the power transmitter 110 and the detector 210.

Figure 12A:
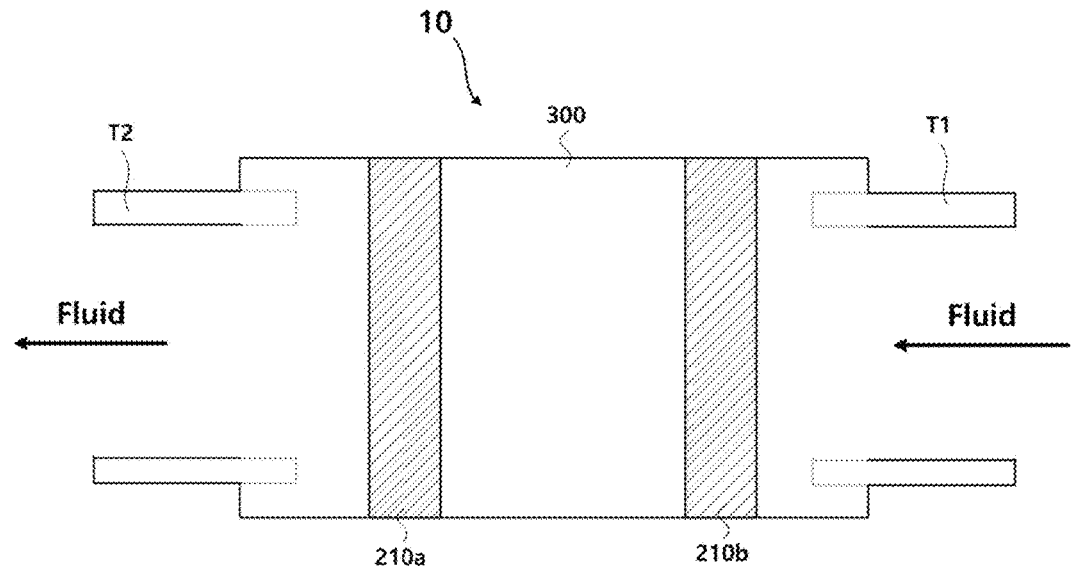
FIGS. 12A and 12B are diagrams illustrating a connection relationship between the fluid detection device according to the present embodiment and tubes through which the fluid flows.
Figure 12B:
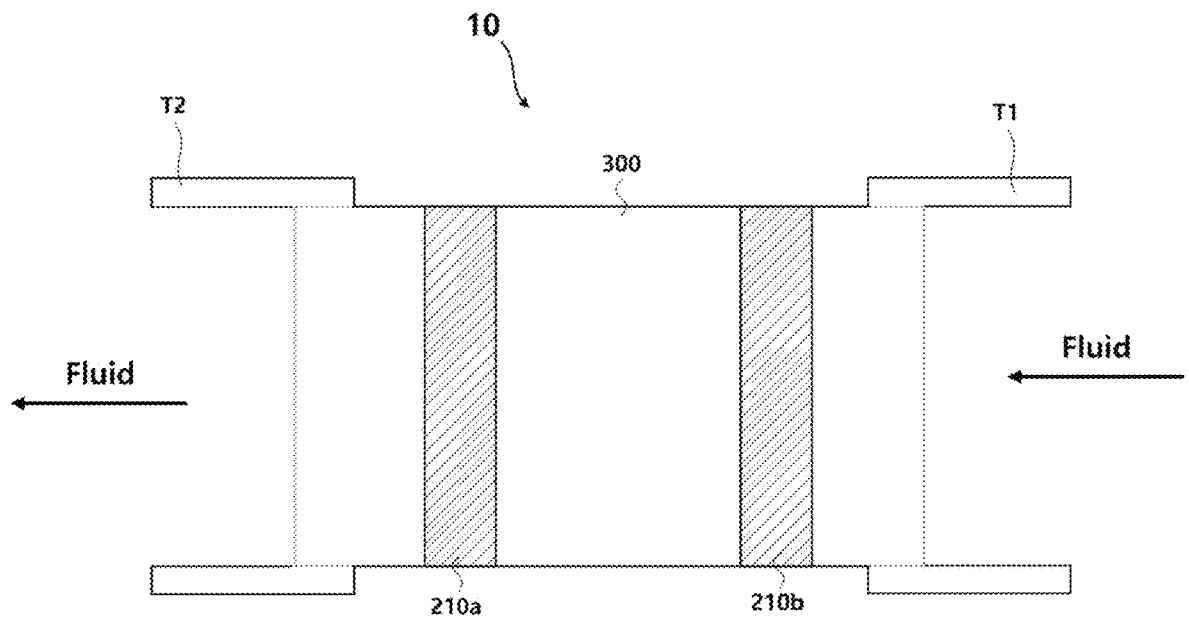

FIGS. 12A and 12B are diagrams illustrating a connection relationship between the fluid detection device 20 according to the present embodiment and tubes T1 and T2 through which the fluid flows. Referring to FIG. 12A, the fluid detection device 20 has a diameter that is greater than diameters of the tubes T1 and T2, and the tubes T1 and T2 through which the fluid flows are inserted into the fluid detection device 20 to be fitted and coupled to the tubes T1 and T2.

In the embodiment illustrated in FIG. 12B, the fluid detection device 20 has a diameter that is smaller than the diameters of the tubes T1 and T2, and the fluid detection device 20 is inserted into the tubes T1 and T2 through which the fluid flows to be fitted and coupled to the tubes T1 and T2.

Hereinafter, the operation of the fluid detection device 20 will be described with reference to FIGS. 10 and 11. As exemplified in FIG. 10, the first electrode 112a and the second electrode 212a are capacitively coupled to form a capacitor C1a, and the first electrode 112b and the second electrode 212b are capacitively coupled to form a capacitor C1b.

The power supply PS is connected to the first electrode 112a of the first capacitor C1a and the first electrode 112b of the second capacitor C1b. The first and second capacitors C1a and C1b including the first electrodes 112a and 112b and the second electrodes 212a and 212b provide power, which is provided from a power supply PS, to the detector 210.

In the embodiment illustrated in FIG. 10, the second electrodes 212a and 212b and the fluid on the responsive layer 310 form polarities of a responsive layer capacitor $C_{EL}$, and the responsive layer 310 forms a dielectric material of the responsive layer capacitor $C_{EL}$.

The power output from the power supply PS is provided to the responsive layer capacitor $C_{EL}$ through the second electrodes 212a and 212b. Characteristics, such as electrical resistance and impedance, of the fluid on the responsive layer 310 vary according to the physical properties of the fluid. That is, fluid resistance Rfluid when the fluid is a polar fluid such as water may be different from fluid resistance Rfluid of a non-polar fluid such as acetone, hexane, or toluene.

Due to electrical resistance Rfluid formed according to the type of fluid, the magnitude of a voltage formed in the responsive layer 310 is different. Thus, according to the characteristics of the fluid, the field induced EL phosphor included in the responsive layer 310 may emit light and provide light having an intensity corresponding to the characteristics of the fluid.

In addition, since the magnitude of the voltage formed in the responsive layer 310 corresponds to the type of fluid, the piezoelectric material included in the responsive layer 310 vibrates in response to the type of fluid and generates a sound. Accordingly, it is possible to tactilely and audibly inform the user of the characteristics of the fluid.

Experimental Example

Referring to FIG. 5 again, an experimental example of the fluid detection device according to the present embodiment will be described. Referring to FIG. 5A, it can be seen that a change in impedance of the DI water is close to zero, and a change in impedance is large in the order of the fluids B, C, D, and E. As shown in FIG. 5B, when the fluids flows, it can be seen that the luminance of light provided by the responsive layer 310 increases in the order of the increasing impedance change.

The luminance of light provided by the responsive layer 310 increases in the order of the increasing impedance change as shown in FIG. 5B, whereas, as shown in FIG. 5C, it can be seen that a peak wavelength of the light is approximately 450 nm in common and it can be confirmed that this is due to the characteristics of the field induced EL phosphor dispersed in the responsive layer 300.

Figure 13A:
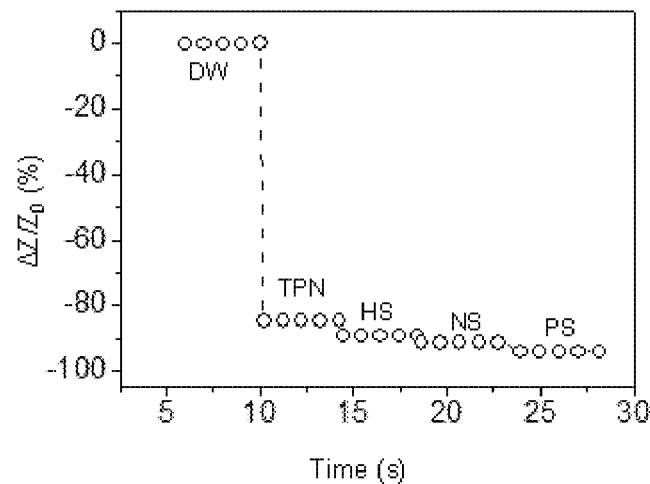
FIG. 13A is a diagram illustrating data obtained by measuring an impedance change by detecting five different fluids including a 5% dextrose aqueous solution (DW), a TPN fluid, Hartmann's solution (HS), physiological saline (normal saline (NS)), and a plasma solution (PS) using the fluid detection device according to the present embodiment.
Figure 13B:
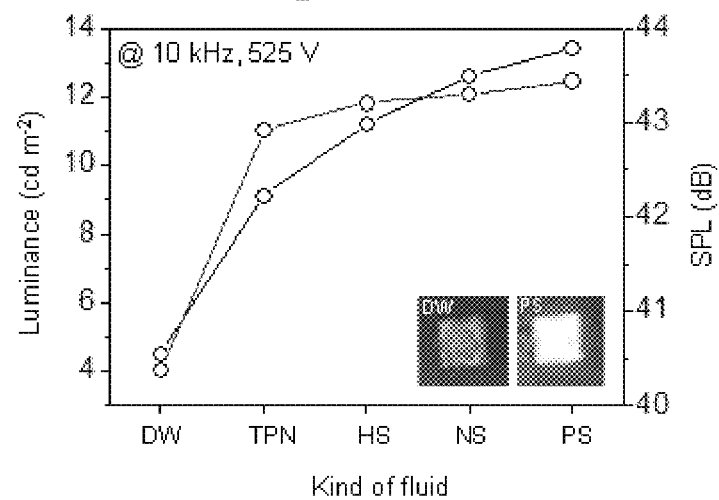
FIG. 13B is a diagram illustrating a light emission intensity and a sound amplitude by detecting the five different fluids using the fluid detection device according to the present embodiment.

FIG. 13A is a diagram illustrating data obtained by measuring an impedance change by detecting five different fluids including 5% DW, a TPN fluid, HS, physiological saline (NS), and PS using the fluid detection device according to the present embodiment, and FIG. 13B is a diagram illustrating a light emission intensity and a sound amplitude by detecting the five different fluids using the fluid detection device according to the present embodiment.

As shown in FIGS. 13A and 13B, it can be seen that the fluid detection device according to the present embodiment is capable of distinguishing five different fluids from each other using a change in impedance, light emission intensity, and the magnitude of vibration.

FIG. 14A is a diagram illustrating states in which, when the fluid does not flow, the fluid detection device according to the present embodiment does not emit light, and when the fluid flows, the fluid detection device emits light to indicate that the fluid is flowing, thereby showing that the fluid detection device emits light to indicate that the fluid is flowing.

FIG. 14B is a diagram illustrating states in which, when the fluid does not flow, the fluid detection device according to the present embodiment provides a sound with a small amplitude, and when the fluid flows, the fluid detection device provides a sound with a relatively large amplitude to indicate that the fluid is flowing, showing that the fluid detection device provides vibrations and a sound to indicate that the fluid is flowing.

FIG. 14C shows a state in which physiological saline and a TPN fluid are connected to the fluid detection device of the present invention through a three-way valve. In an initial step, a fluid did not flow through the fluid detection device, and in step 1, NS was provided through the fluid detection device for 12 hours. After 6 hours, the TPN fluid was provided for 12 hours in step 2, and as a result, the NS and the TPN fluid were provided through the fluid detection device for 6 hours (step 3). After the injection of the NS was completed, the TPN fluid was provided for the remaining time. After the injection of the TPN fluid was completed, the NS was provided again (final step).

FIG. 14D shows sound amplitudes in the initial step, step 1, step 2, step 3, and the final step over time, FIG. 14E shows a light emission intensity over time, and FIG. 14F shows a change in impedance.

As shown in the drawings, according to the fluid detection device according to the present embodiment, different fluids may be displayed to the user by differently displaying sound amplitude and light emission intensity. Furthermore, since impedance is detected for different fluids, a wide range of applications can be achieved using the detected impedance.

According to the present embodiment, there is provided an advantage in that a structure can be simplified because a rectifier is not required due to using an element driven by an electric signal. Furthermore, there is also provided an advantage of being flexible and resistant to deformation.

In order to aid understanding of the present invention, the description has been made with reference to embodiments shown in the accompanying drawings, but these embodiments are for implementation and are merely illustrative. Thus, those skilled in the art will appreciate that various modifications and equivalent other embodiments can be derived without departing from the scope of the present invention. Therefore, the true technical scope of the present invention should be defined by the appended claims.

What is claimed is:

1. A detection device comprising:
a power transmitter including a first substrate and first electrodes formed on the first substrate; and
a detector including a second substrate, second electrodes formed on the second substrate, and a responsive layer configured to generate vibrations, light emission, and sound in response to a stimulus,
wherein each of the second electrodes are capacitively coupled to one of the first electrodes and the first electrodes are connected to a power supply to provide driving power.

2. The detection device of claim 1, which detects electrical characteristics of a fluid located on a second surface of the responsive layer.

3. The detection device of claim 1, further including a stimulus detection layer positioned on the responsive layer and configured to detect a stimulus.

4. The detection device of claim 3, wherein the stimulus detection layer is a pressure detection layer of which electrical characteristics change with pressure.

5. The detection device of claim 4, wherein the pressure detection layer has a pyramid structure and includes any one among PVDF-HFP, and EMIMTFSI.

6. The detection device of claim 3, wherein the stimulus detection layer includes a thermal detection layer of which electrical characteristics change with temperature.

7. The detection device of claim 6, wherein the thermal detection layer includes any one or more among PEO, LiTFSI, and PEGDME.

8. The detection device of claim 2, wherein the responsive layer responds by varying an intensity of light emission, an intensity of vibration, and a sound amplitude according to the electrical characteristics.

9. The detection device of claim 2, wherein the responsive layer includes a piezoelectric material in which a field induced electroluminescent (EL) phosphor is dispersed.

10. The detection device of claim 9, wherein the piezoelectric material includes a fluorinated polymer.

11. A detection device comprising:
a power transmitter including a first substrate and a first electrode formed on the first substrate; and a detector including a second substrate, a second electrode formed on the second substrate, and a responsive layer configured to generate vibrations, light emission, and sound in response to a stimulus, wherein the first electrode is capacitively coupled to the second electrode to provide driving power to the second electrode, and a pattern formed on an object positioned on the responsive layer forms an electric field corresponding to the pattern in the responsive layer, and the responsive layer responds to the electric field.

12. The detection device of claim 11, wherein the responsive layer responds by varying an intensity of light emission, an intensity of vibration, and a sound amplitude according to an intensity of the electric field.

13. The detection device of claim 11, wherein the responsive layer includes a piezoelectric material in which a field induced electroluminescent (EL) phosphor is dispersed.

14. The detection device of claim 13, wherein the piezoelectric material includes a fluorinated polymer.

15. A fluid detection device comprising:
a detector including a tube-shaped substrate, second electrodes formed on an inner surface of the tube-shaped substrate, and a responsive layer configured to generate vibrations, light emission, and sound according to characteristics of a fluid by being brought into contact with the fluid flowing through the tube-shaped substrate; and
a power transmitter which includes an external substrate and first electrodes formed on the external substrate and connected to a power supply and which is positioned to be spaced apart from the detector,
wherein each of the second electrodes are capacitively coupled to one of the first electrodes and receive power from the power transmitter.

16. The fluid detection device of claim 15, wherein the tube-shaped substrate is fitted and coupled to a tube through which the fluid flows.

17. The fluid detection device of claim 15, wherein the responsive layer responds by varying an intensity of light emission, an intensity of vibration, and a sound amplitude according to the electrical characteristic.

18. The detection device of claim 15, wherein the responsive layer includes a piezoelectric material in which a field induced electroluminescent (EL) phosphor is dispersed.

19. The fluid detection device of claim 18, wherein the piezoelectric material includes a fluorinated polymer.

20. The fluid detection device of claim 18, wherein the field induced EL phosphor includes any one among ZnS:Mn, ZnS:Cu, and ZnS:Al.

21. The fluid detection device of claim 15, wherein:
the external substrate includes a transparent substrate; and
the first electrode includes a transparent electrode.

22. The fluid detection device of claim 15, wherein the first electrode formed on the external substrate is formed of a conductive polymer.

23. The detection device of claim 4, wherein the responsive layer responds by varying an intensity of light emission, an intensity of vibration, and a sound amplitude according to the electrical characteristics.

24. The detection device of claim 6, wherein the responsive layer responds by varying an intensity of light emission, an intensity of vibration, and a sound amplitude according to the electrical characteristics.

25. The detection device of claim 4, wherein the responsive layer includes a piezoelectric material in which a field induced electroluminescent (EL) phosphor is dispersed.

26. The detection device of claim 25, wherein the piezoelectric material includes a fluorinated polymer.

27. The detection device of claim 6, wherein the responsive layer includes a piezoelectric material in which a field induced electroluminescent (EL) phosphor is dispersed.

28. The detection device of claim 27, wherein the piezoelectric material includes a fluorinated polymer.

* * * * *